(12) United States Patent
Binder et al.

(10) Patent No.: US 12,537,212 B2
(45) Date of Patent: Jan. 27, 2026

(54) MEMBRANE ELECTRODE ASSEMBLY, AND FUEL CELL, ELECTROLYTIC CELL, ELECTROCHEMICAL HYDROGEN COMPRESSOR, REDOX FLOW BATTERY OR ELECTROCHEMICAL SENSOR COMPRISING THE MEMBRANE ELECTRODE ASSEMBLY

(71) Applicant: Greenerity GmbH, Alzenau (DE)

(72) Inventors: Matthias Binder, Gelnhausen (DE); Sarayut Leeratanaphanit, Offenbach am Main (DE); Alessandro Ghielmi, Frankfurt am Main (DE); Jens-Peter Suchsland, Alzenau (DE)

(73) Assignee: Greenerity GmbH, Alzenau (DE)

( * ) Notice: Subject to any disclaimer, the term of this patent is extended or adjusted under 35 U.S.C. 154(b) by 662 days.

(21) Appl. No.: 17/917,752

(22) PCT Filed: Feb. 16, 2021

(86) PCT No.: PCT/EP2021/053737
§ 371 (c)(1),
(2) Date: Oct. 7, 2022

(87) PCT Pub. No.: WO2021/204445
PCT Pub. Date: Oct. 14, 2021

(65) Prior Publication Data
US 2023/0170510 A1 Jun. 1, 2023

(30) Foreign Application Priority Data
Apr. 7, 2020 (DE) .......................... 102020204503.8

(51) Int. Cl.
*H01M 8/1004* (2016.01)
*H01M 8/0273* (2016.01)
(Continued)

(52) U.S. Cl.
CPC ....... *H01M 8/1004* (2013.01); *H01M 8/0273* (2013.01); *H01M 8/0282* (2013.01); *H01M 8/0284* (2013.01); *H01M 8/18* (2013.01)

(58) Field of Classification Search
CPC ............. H01M 8/0273; H01M 8/1004; H01M 8/0282; H01M 8/0284; H01M 8/18
See application file for complete search history.

(56) References Cited

U.S. PATENT DOCUMENTS

| 6,475,656 B1 | 11/2002 | Koschany et al. |
| 10,115,977 B2 | 10/2018 | Bauer et al. |

(Continued)

FOREIGN PATENT DOCUMENTS

| CN | 1735988 A | 2/2006 |
| CN | 106463746 A | 2/2017 |

(Continued)

OTHER PUBLICATIONS

Notification of First Office Action dated Dec. 28, 2024, from counterpart Chinese Application No. 202180025677.9.

(Continued)

*Primary Examiner* — Sarah A. Slifka
(74) *Attorney, Agent, or Firm* — DLA Piper LLP (US)

(57) ABSTRACT

A membrane electrode assembly includes a cathode, an anode, a proton-conductive membrane arranged between the cathode and the anode and a sealing frame which surrounds the cathode, the anode and the membrane at the edges thereof, wherein in the inner region of the sealing frame at least mutually superposed subregions of the cathode, of the anode and of the membrane are exposed, wherein the sealing frame in the layer thickness direction comprises a first sealing layer and a second sealing layer which are bonded to (Continued)

each other by an adhesive and wherein the first sealing layer and/or the second sealing layer has a reinforcement structure.

11 Claims, 10 Drawing Sheets

(51) Int. Cl.
   *H01M 8/0282* (2016.01)
   *H01M 8/0284* (2016.01)
   *H01M 8/18* (2006.01)

(56) References Cited

U.S. PATENT DOCUMENTS

| | | |
|---|---|---|
| 2006/0073385 A1 | 4/2006 | Andrin et al. |
| 2006/0234097 A1 | 10/2006 | Boehm et al. |
| 2007/0298302 A1 | 12/2007 | Oschmann |
| 2011/0159401 A1 | 6/2011 | Chen et al. |
| 2013/0241158 A1 | 9/2013 | Koga et al. |
| 2019/0273268 A1 | 9/2019 | Ebato et al. |

FOREIGN PATENT DOCUMENTS

| | | |
|---|---|---|
| CN | 108123150 A | 6/2018 |
| DE | 10 2010 003 866 A1 | 7/2011 |
| DE | 10 2013 014 083 A1 | 3/2015 |
| DE | 10 2015 215 496 A1 | 2/2017 |
| DE | 10 2019 202 682 A1 | 9/2019 |
| EP | 2 089 930 A2 | 8/2009 |
| JP | 2008-123957 A | 5/2008 |
| JP | 2009-135042 A | 6/2009 |
| WO | 2004062015 A2 | 7/2004 |
| WO | 2008/063399 A2 | 5/2008 |
| WO | 2015145129 A1 | 10/2015 |

OTHER PUBLICATIONS

International Search Report dated May 18, 2021 in counterpart International Application No. PCT/EP2021/053737.
Written Opinion dated May 18, 2021 in counterpart International Application No. PCT/EP2021/053737.
Decision to Grant dated Jun. 30, 2025, from counterpart Chinese Patent Application No. 202180025677.9.

MEMBRANE ELECTRODE ASSEMBLY, AND FUEL CELL, ELECTROLYTIC CELL, ELECTROCHEMICAL HYDROGEN COMPRESSOR, REDOX FLOW BATTERY OR ELECTROCHEMICAL SENSOR COMPRISING THE MEMBRANE ELECTRODE ASSEMBLY

TECHNICAL FIELD

This disclosure relates to a membrane electrode assembly having improved sealing and also to a fuel cell, an electrolytic cell, an electrochemical hydrogen compressor, a redox flow battery or an electrochemical sensor having such a membrane electrode assembly.

BACKGROUND

Membrane electrode assemblies, referred to as MEAs, for electrochemical applications such as, for example, for use in fuel cells, water electrolysis and electrochemical sensors, comprise a proton-conductive membrane arranged between an anode and a cathode. To prevent reaction gases from unintentionally escaping from the MEA or from unintentionally passing from the anode side to the cathode side and vice versa, and also to facilitate handling of the MEA and save on material in the layers of the MEA, MEAs are typically surrounded by a seal in the form of a frame. The frame-form seal can additionally increase the service life of the MEA since it can prevent direct contact of an MEA-flanking gas diffusion layer with the MEA. EP 2 089 930 A2 describes a membrane electrode assembly having a sealing frame which comprises an upper plastics film and a lower plastics film, wherein the plastics films are bonded to each other by an adhesive layer. It is a disadvantage of the sealed MEA disclosed in EP 2 089 930 A2 that the adhesive of the adhesive layer has a tendency to creep under the operating conditions of the MEA, meaning that the adhesive layer flows and settles, which results in a thinning of the frame-form seal in the edge region of the MEA, greatly reducing sealing performance. Since several hundred MEAs are used in a membrane electrode stack, such thinning leads to a large dimensional change in the membrane electrode stack, resulting in limitations on the power density and service life.

It could therefore be helpful to provide a membrane electrode assembly comprising a sealing frame which features particularly low settling, creep and flow behavior under customary operating pressure and temperature, and to provide a fuel cell, an electrolytic cell, an electrochemical hydrogen compressor, a redox flow battery and an electrochemical sensor comprising such a membrane electrode assembly, these featuring good long-term power density and hence a very long service life.

SUMMARY

We provide a membrane electrode assembly including a cathode; an anode; a proton-conductive membrane arranged between the cathode and the anode, and a sealing frame that surrounds the cathode, the anode and the membrane at edges thereof, wherein, in an inner region of the sealing frame at least mutually superposed subregions of the cathode, of the anode and the membrane are exposed, the sealing frame, in a layer thickness direction comprises a first sealing layer and a second sealing layer bonded to each other by an adhesive, and the first sealing layer and/or the second sealing layer has a reinforcement structure.

We also provide a fuel cell, electrolytic cell, electrochemical hydrogen compressor, redox flow battery or electrochemical sensor including the membrane electrode assembly including a cathode; an anode; a proton-conductive membrane arranged between the cathode and the anode, and a sealing frame that surrounds the cathode, the anode and the membrane at edges thereof, wherein, in an inner region of the sealing frame at least mutually superposed subregions of the cathode, of the anode and the membrane are exposed, the sealing frame, in a layer thickness direction comprises a first sealing layer and a second sealing layer bonded to each other by an adhesive, and the first sealing layer and/or the second sealing layer has a reinforcement structure.

LIST OF REFERENCE SIGNS 1 first sealing layer
2 second sealing layer
3 adhesive
4 reinforcement structure
5' first carrier film of the first sealing layer
5" second carrier film of the second sealing layer
6 CCM
6a anode
6b membrane
6c cathode
7 window-like cutout
8 inner region of the sealing frame
8' inner region of the first sealing layer
8" inner region of the second sealing layer
9 exposed subregion of the anode, cathode and membrane arranged one above the other 10, 20, 30, 100 MEA
11 overlap region
12 raised structure
12a second linear raised structure
13 cavity
14 surface of the first side of a sealing layer
15 first side of a sealing layer
16 second side of a sealing layer
17 base layer
18 linear substructure
19 perpendicular substructure h height of the raised structure
h1 height of the base layer
x length of a ridge
y width of a ridge
x2 width of the perpendicularly running substructures of an L-shaped ridge
y2 length of the perpendicularly running substructures of an L-shaped ridge
w spacing of ridges in the longitudinal direction of the ridges
x3 width of a raised structure
y3 width of adjoining rectangles
w3 width of the raised structures 12 along the length x3 of adjoining rectangles
S layer thickness direction

DETAILED DESCRIPTION

Our membrane electrode assembly comprises a cathode, an anode, a proton-conductive membrane arranged between the cathode and the anode and a sealing frame configured in a specific way. The sealing frame is configured to surround the cathode, the anode and the membrane at the edges thereof. This means that the cathode, the anode and the membrane are surrounded at their outer edges on all sides by a frame-form seal.

A frame-form seal or a sealing frame means a sealing structure configured like a picture frame and having a free inner region between the respective inner edges of the sealing frame formed as a picture-like or window-like cutout. In this inner region at least mutually superposed subregions of the cathode, the anode and the membrane are exposed and are consequently not covered by the sealing frame. In this example, the sealing frame may merely be connected to the edges of the cathode, the anode and the membrane at their respective outer peripheries, or else may partially overlap the cathode, the anode and/or the membrane in the layer thickness direction of the MEA, that is to say in the assembly direction of the layers of the MEA. The layer thickness direction also corresponds to the stacking direction of the MEA, that is to say the assembly direction of the anode, the membrane and the cathode.

The sealing frame, in the layer thickness direction, comprises a first sealing layer and a second sealing layer bonded to each other by an adhesive. The adhesive is in contact with both the first sealing layer and the second sealing layer. In addition, the first sealing layer and/or the second sealing layer has a reinforcement structure. The reinforcement structure may be present in subregions of the first and/or second sealing layer or else be distributed over the entire first and/or second sealing layer. The reinforcement structure features a high retention capacity for the adhesive. In fact, the reinforcement structure prevents the adhesive from creeping or flowing out from the sealing frame. This suppresses any settling behavior of the MEA and the MEA also features a high power density and consequently a long service life when used as intended.

The reinforcement structure may be formed in the first sealing layer and/or in the second sealing layer. This means that the reinforcement structure is not used as a separate layer but instead the reinforcement structure is formed directly in the first sealing layer and/or in the second sealing layer and hence is an integral constituent of the first sealing layer and/or of the second sealing layer. For example, corresponding reinforcement structures may be applied or sprayed onto a surface of a sealing layer, for example, by plastic injection molding or hot forming. Some reinforcement structures may also be extruded. As an alternative to this, reinforcement structures may also be formed by depressing subregions of the sealing layer so that those subregions which have not been depressed feature a raised structure. A depression may be formed, for example, by mechanical treatment of a surface of a sealing layer, for example, by indenting, stamping or compacting. In particular, raised structures may be incorporated by impressing a roller equipped with a negative of the raised structures, the roller being heated in particular. This example has the advantage that there is no need to provide an additional layer for the reinforcement structures and that, depending on the dimensions of the sealing layers, appropriate reinforcement structures can be integrated directly into the first and/or second sealing layer. In this example, the provision of a reinforcement structure in one sealing layer is sufficient. However, reinforcement structures may also be formed in the first and in the second sealing layer.

To obtain a sealing layer comprising an integrated reinforcement structure as described above, according to a further preferred example a first side of the first and/or second sealing layer may have raised structures. A first side of the first and/or second sealing layer means that side or surface of the corresponding sealing layer which is oriented in the MEA in the direction of a first side of the corresponding second or first sealing layer. The raised structures have a height of more than 3 µm, preferably of more than 10 µm and particularly preferably of more than 15 µm. The height of the raised structures is measured starting from the surface of the first side on which the raised structures are formed up to the highest point of the raised structures in the layer thickness direction, that is to say perpendicular to the circumferential direction of the sealing frame. As a result of the formation of the raised structures, cavities, or in other words depressions, are formed between the raised structures, these taking up the adhesive and preventing creeping or leaking. The respective second side of the first and/or second sealing layer formed with raised structures on the first side is in this example flat and has neither raised structures nor depressions. These are only formed on the first side.

The raised structures more advantageously comprise ridges that are in particular of L-shaped, T-shaped or cross-shaped form. As a result, retaining structures for the adhesive can be formed very well and easily and can be adapted very well to the dimensions of the sealing frame. The ridges in particular have a width of 5 µm to 5 mm, preferably of 50 µm to 500 µm, and a length of 10 µm to 10 mm, preferably of 100 µm to 1 mm. The width of a ridge is the shortest side and the length of the ridge is the longest side, the length and the width of the ridge lying perpendicular to the height of the ridge. The dimensions above make it particularly readily possible to retain a desired amount of adhesive in the sealing frame and to prevent the latter from creeping or flowing out.

Due to a very good holding capacity and hence a very high retention ability for the adhesive, cavities lying between the raised structures are preferably square, rectangular, circular or hexagonal. This means that the raised structures are configured such that between them are formed depressed regions or in other words depressions or cavities which are square, rectangular, circular or hexagonal. Combinations of these cavity forms are also possible.

Also advantageously in the light of good dimensional stabilization of the adhesive and hence particularly good suppression of the creep behavior or outflow of the adhesive, a proportion by volume of cavities present between the raised structures, based on the total volume of cavities and of raised structures, is 10% to 99%, preferably 12% to 80% and more preferably 15% to 70%. The higher the proportion by volume of the cavities, the more adhesive can be locally bound. The lower the proportion by volume of the cavities, the greater the proportion by volume of the raised structures as well and the more stable the sealing layer can be. A proportion by volume of the cavities of from 15% to 50% has proven to be particularly advantageous in the light of a good stability of the sealing layer with at the same time very high adhesive retention capacity. The term "proportion by volume of cavities" means the sum total of the volumes of all cavities formed in the sealing layer.

Further advantageously, the first sealing layer and/or the second sealing layer comprises a carrier film and a reinforcement structure in the form of a reinforcement layer. In other words, this means that the corresponding sealing layer (i.e., the first sealing layer, the second sealing layer or both sealing layers) is in the form of at least two layers and has a carrier film and a reinforcement layer in contact with the carrier film. The carrier film may be bonded with the reinforcement layer, for example, by lamination. However, the reinforcement layer may also be bonded with the surface of the carrier film in another manner, with it being possible for such a bond to be produced, for example, by an adhesive. A mechanical bond is also possible, for example, in the form of a form-fitting and/or force-fitting connection. The reinforcement layer is arranged here on the carrier film of the first and/or second sealing layer such that it faces in the direction of the corresponding second or first sealing layer. This example has the advantage that the provision of the reinforcement structures in the form of a reinforcement layer is very simple and inexpensive and the reinforcement layer can be stored easily.

In this example, the reinforcement structure preferably comprises a woven structure and/or a porous structure and/or a perforated structure. Woven structures can be produced inexpensively with the desired mesh size and configuration. Woven structures can be produced using polymer filaments. The polymer filaments are characterized by thread diameters and the woven fabric is characterized by the weft number and warp number, the weave pattern and the resulting overall thickness. The overall thickness can be reduced especially at the crossing points of warp and weft by hot pressing, what is known as calendering. The calendering also fuses warp and weft, increasing the stability of the woven fabric and improving the processability. Porous structures have more or less irregularly sized openings, referred to as pores, which can take up the adhesive. They can be produced by axially or biaxially stretching a film. In contrast, perforated structures are produced in particular by perforation, for example, by a blade, a punch or a needle, or using a laser. All openings provided in the reinforcement structure (pores, perforations, fabric passage openings and the like) share the feature that they completely penetrate the reinforcement layer in the layer thickness direction and hence lead from a first side to a second side of the reinforcement layer. This is an essential difference from a sealing layer comprising raised structures, which always has a closed base layer the height of which in the layer thickness direction does not count towards the height of the raised structures. In this example, the carrier film constitutes the closed base layer. The porous, woven or perforated reinforcement structures described allow the adhesive to penetrate into the reinforcement layer, and more precisely allow the adhesive of the sealing frame to fill and impregnate the reinforcement layer. As a result, the adhesive is spatially confined, and the softening of the adhesive under high pressure and high temperature, as prevail when the membrane electrode assembly is in use, does not lead to flowing of the adhesive, which effectively prevents settling behavior and thinning of the MEA in the edge region.

Particularly stable and easy-to-obtain reinforcement structures preferably comprise fibers, and especially carbon fibers, a metal mesh, porous ceramics or polymers, in particular selected from the group of polyolefins, polyesters, aromatic polymers, (per)fluorinated polymers, polysiloxanes or mixtures thereof. Reinforcement structures made of polymers may be porous or perforated or woven, with porous polymer structures being producible, for example, by foaming the polymer. Polymers can also be in the form of open mesh woven fabrics such as are known, for example, from the screen printing field, with individual polymer fibers having a defined yarn diameter. The size of the individual mesh openings or the mesh size is defined here by yarn diameter and thread count (i.e., number of threads per unit of length). The weave pattern can also be varied, with linen weave or Panama weave being customary, among others. Furthermore, the woven fabric may be calendered, as a result of which on the one hand greater stability is achieved due to the bonding of warp and weft at the crossing points since warp and weft can no longer slip. On the other hand, the overall thickness is reduced in that the round yarn diameter is pressed into an oval shape. This also brings about a reduction in the open surface, that is to say in a proportion by volume of the through-holes formed in the reinforcement layer.

A proportion by volume of through-holes such as, for example, pores, perforations or fabric through-holes, formed in the reinforcement layer, based on the total volume of the reinforcement layer, is advantageously 10% to 99%, preferably 12% to 80% and more preferably 15% to 70%. A through-hole size distribution can be ascertained here by DIN 66134:1998-02-Determination of the pore size distribution and the specific surface area of mesoporous solids by nitrogen sorption—Method of Barrett, Joyner and Halenda (BJH). The method mentioned above applies in particular to the determination of the proportion by volume of through-holes in porous structures. For perforations, the proportion by volume of through-holes is calculated directly via the geometry of the perforation, that is to say from the perforation diameter and number of perforations per unit of surface area. For woven fabrics, the proportion by volume of through-holes is likewise calculated from the yarn diameter and from the thread count. This makes it possible to calculate the volume of the thread (area of the yarn cross section and length of the thread in a unit cell, the unit cell being defined from thread to thread).

To reinforce the structure of the MEA, there is provision according to an advantageous development for an inner region of the reinforcement layer to be larger than an inner region of the carrier film. In other words, this means that the picture-like or window-like cutout in the reinforcement layer is larger than the picture-like or window-like cutout in the carrier film. The window-like cutout in the reinforcement layer can be larger than or equal to the area of the membrane electrode assembly so that the reinforcement layer and the membrane electrode assembly have no overlap region, or the window-like cutout in the reinforcement layer can be smaller than the area of the membrane electrode assembly so that the reinforcement layer and the membrane electrode assembly have an overlap region. If the window-like cutout in the reinforcement layer is larger than or equal to the area of the membrane electrode assembly, the mechanical stress on the membrane electrode assembly is reduced since the overall thickness in the overlap region of the membrane electrode assembly and the carrier film is less thick. It may thus be advantageous for the purposes of long-term stability and gas-tightness if the reinforcement layer and membrane electrode assembly have no overlap region.

To impart particularly good temperature stability on the sealing frame, the reinforcement structure advantageously has a softening temperature of more than 75° C., preferably of more than 90° C., more preferably of more than 105° C., and particularly preferably of more than 120° C. and furthermore preferably of more than 160° C. A corresponding softening temperature can be obtained by suitable selection of material in the light of the desired temperature stability, which in particular is guided by the intended use of the MEA.

To provide particularly a high sealing function and isolation function for the membrane, it may be more advantageously provided that the first sealing layer and/or the second sealing layer overlaps the anode and/or the cathode and/or the membrane and forms an overlap region. This means, for example, that the subregion of the anode, cathode and membrane arranged one above the other is larger than the inner region of the sealing frame. The subregions of the anode, cathode and membrane are thus in particular clamped between the first and second sealing layers, which also results in a particularly high stability of the MEA.

For reasons of simple manufacturability, the sealing frame overlaps the anode, the cathode and the membrane, in particular in equal parts. This makes it possible to cut assemblies of anode, membrane and cathode already arranged one above the other to size in one step such that a corresponding overlap region with the sealing frame results.

Further advantageously, a layer thickness of an adhesive layer formed by the adhesive is at least as great as the sum total of the heights of the raised structures in the first and second sealing layers. This means that the adhesive may also merely be present in the cavities or depressions existing between the raised structures and may terminate flush with an upper side of the raised structures. In this example, the reinforcement structure is impregnated with the adhesive. If raised structures are present only in the first sealing layer, then the upper side of the raised structures of the first sealing layer and the adhesive are directly in contact with the second sealing layer.

If raised structures are present both in the first sealing layer and in the second sealing layer, the adhesive is present in the respective cavities or depressions of the corresponding sealing layer and each terminates flush with the respective upper side of the raised structures corresponding sealing layer so that the adhesive present in the cavities of the first sealing layer is connected both with the second sealing layer and with adhesive present in the cavities of the second sealing layer. The adhesive present in the cavities of the second sealing layer is also connected both with the first sealing layer and with adhesive present in the cavities of the first sealing layer.

This example makes it possible for good contact between the first and second sealing layers to be produced via the adhesive so that a good stability of the overall composite is also achieved.

Alternatively, it is advantageously provided that a layer thickness of an adhesive layer formed by the adhesive is at least as great as the layer thickness of reinforcement layers present in the first and second sealing layers. As has already been stated multiple times, the layer thicknesses are measured in the layer thickness direction or stack direction of the MEA. The reinforcement layer may also be present only in the first sealing layer or only in the second sealing layer or else in both sealing layers. If a reinforcement layer is present only in one sealing layer, then the adhesive layer formed by the adhesive terminates flush with the upper side of the reinforcement layer. This also applies on both sides if reinforcement layers are present in the first and in the second sealing layer.

In both of the above examples, the adhesive is at least, and advantageously exclusively, present in the reinforcement structures to suppress the creep behavior and outflow behavior to the maximum extent.

Further advantageously, a pure adhesive layer formed by the adhesive is present between the first sealing layer and the second sealing layer. The pure adhesive layer consists only of adhesive and, as viewed in the layer thickness direction, lies between the first sealing layer and the second sealing layer. The pure adhesive layer thus does not comprise any reinforcement structure. To prevent outflow or creeping particularly effectively, a layer thickness of the pure adhesive layer is preferably less than 30 µm, in particular less than 20 µm and in particular less than 10 µm.

To simplify the production of the MEA, the anode and the cathode are applied directly to the membrane and form a catalyst-coated membrane (CCM).

More advantageously, the membrane electrode assembly comprises a first gas diffusion layer arranged on a face of the anode that faces away from the membrane and a second gas diffusion layer arranged on a face of the cathode that faces away from the membrane. In this example, gas passage openings may also be provided in the sealing frame, these serving for the supply of the reaction gases.

Production of the membrane electrode assembly can be carried out in various ways, with the following nonlimiting examples being given:

First, in a preceding step, the reinforcement structure in the form of a reinforcement layer can first be bonded to the first sealing layer, with the sealing layer preferably including an adhesive in the form of at least one adhesive layer. The bonding may, for example, be effected under pressure and temperature in a lamination step. If the adhesive layer softens as a result of the heating, the application of pressure achieves filling or impregnation of the reinforcement structure. Exposed inner regions in the form of window-like cutouts are then produced in the first and second sealing layers by cutting or punching. In this process regime, the first and second sealing layers and the reinforcement structure have the same dimensions.

Furthermore, a membrane electrode assembly, which comprises a cathode, an anode and a membrane lying therebetween, and which in particular is in the form of a CCM and is provided as sheet product, is connected with respect to the first and second sealing layers such that the membrane electrode assembly completely fills the window-like cutouts in the sealing layers and a circumferential overlap region is obtained between the membrane electrode assembly and the first and second sealing layers. The membrane electrode assembly and first and second sealing layers are bonded by thermal activation or UV treatment of the at least one adhesive layer so that a stable bond with high gas-tightness is achieved. In particular, the adhesive layer can be activated under pressure to improve filling or impregnation of the reinforcement structure.

Alternatively, second process regime, window-like cutouts are produced in the first and second sealing layers and in the reinforcement structure. The window-like cutout in the reinforcement structure may in this example be larger than or equal to the window-like cutouts in the first and second sealing layers. In a subsequent step, the first and second sealing layers, the reinforcement structure and a membrane electrode assembly as defined above, the latter likewise advantageously being in the form of a CCM, are arranged with respect to one another such that the membrane electrode assembly completely fills the window-like cutouts in the first and second sealing layers so that a circumferential overlap region is formed between the membrane electrode assembly and the first and second sealing layers. The window-like cutout in the reinforcement structure can be larger than or equal to the area of the membrane electrode assembly so that the reinforcement structure and the membrane electrode assembly have no overlap region, or the window-like cutout in the reinforcement structure can be smaller than the area of the membrane electrode assembly so that the reinforcement structure and the membrane electrode assembly have an overlap region. All components are then bonded together by thermal activation or UV treatment of the at least one adhesive layer. In particular, the adhesive layer can be activated under pressure to improve filling or impregnation of the reinforcement structure.

The advantage of the second process regime lies in the flexibility in the selection of the size of the window-like cutouts between first and second sealing layers and the reinforcement structure. It may further be advantageous for the purposes of long-term stability and gas-tightness if the reinforcement structure and membrane electrode assembly have no overlap region. In addition, the reinforcement structure may be arranged particularly symmetrically between the first and second sealing layers.

In a final step, gas diffusion layers may be attached to the membrane electrode assembly provided with sealing frame. The GDLs may, for example, be attached by use of a thermally activated or UV-activated adhesive in the edge region or be bonded to the surface of the membrane electrode assembly by lamination. GDLs on the anode side and cathode side may be identical or different.

We also provide a fuel cell, an electrolytic cell, an electrochemical hydrogen compressor, a redox flow battery or an electrochemical sensor comprising the membrane electrode assembly disclosed hereinabove and featuring by virtue of the latter a high power density and long service life when used as intended.

Further details, advantages and features become apparent from the following description of examples with reference to the drawings.

The figures illustrate only the essential features. All other features are omitted for the sake of clarity. Furthermore, identical reference signs denote the same parts/components.

EXAMPLES

The examples which follow illustrate the production of sealing frames for membrane electrode assemblies and the settling behavior thereof.

Example 1

The sealing frame produced according to Example 1 comprised a first sealing layer and a second sealing layer each provided with adhesive in the form of an adhesive layer having a nominal layer thickness of in each example 15 µm. The reinforcement structure contained in the sealing frame consisted of a reinforcement layer formed from woven polyethylene tereph-thalate (PET) material having a layer thickness of 43 µm and a proportion by volume of through-holes of 15.1%. The warp and weft thread count was in each example 180 $cm^{-1}$ with a thread diameter of 27 µm. This resulted in a proportion by volume to be filled with adhesive of 52%, based on the total volume of the woven fabric, and a layer thickness to be filled of 22.4 µm.

Example 2

The sealing frame produced according to Example 2 comprised a first sealing layer and a second sealing layer each comprising an adhesive in the form of an adhesive layer of in each example a nominal 15 µm. The reinforcement structure consisted of a reinforcement layer formed from woven polyethylene terephthalate (PET) material having a layer thickness of 42 µm and a proportion by volume of through-holes of 28.6%. The warp and weft thread count was in each example 150 $cm^{-1}$ with a thread diameter of 27 µm. This resulted in a proportion by volume to be filled with adhesive of 59%, based on the total volume of the woven fabric, and a layer thickness to be filled of 24.8 µm.

Example 3

The sealing frame produced according to Example 3 comprised a first sealing layer and a second sealing layer each comprising an adhesive in the form of an adhesive layer of in each example a nominal 15 µm. The reinforcement structure consisted of a reinforcement layer formed from woven polyetheretherketone (PEEK) material having a layer thickness of 50 µm and a proportion by volume of through-holes of 58%. The warp and weft thread count was respectively 73 $cm^{-1}$ and 52 $cm^{-1}$ with a thread diameter of 38 µm. This resulted in a proportion by volume to be filled with adhesive of 72%, based on the total volume of the woven fabric, and a layer thickness to be filled of 35.8 µm.

Comparative Example 1

The sealing frame produced according to Comparative Example 1 was a composite of first and second sealing layers but without a reinforcement structure, with the first and second sealing layers each being provided with an adhesive in the form of an adhesive layer of in each example 15 µm.

Measurement of the Settling Behavior

To determine the settling behavior of the sealing frames from Examples 1 to 3 and Comparative Example 1 (Table 1), the respective composites of the layers of the sealing frames made up of first and second sealing layers were installed in an apparatus allowing a defined pressure to be set. The pressure was adjusted to 6.67 MPa and the apparatus heated to a temperature of 95° C. for a duration of 72 h. The thickness of the composite was measured by a scanning electron microscope at a location that was not subjected to pressure and at a location that was subjected to pressure. The difference in the thicknesses corresponded to the settling behavior.

TABLE 1

| Test | Reinforcement material | Yarn diameter/ μm | Warp/weft thread count/ cm$^{-1}$ | Open area/ % | Total thickness/ μm | Porosity/ % | Thickness to be filled by open area/ μm | Thickness to be filled by volume/ μm | Film material | Adhesive material | Total thickness of adhesive/ μm |
|---|---|---|---|---|---|---|---|---|---|---|---|
| Example 1 | PET | 27 | 180/180 | 26.4* | 43 | 52.1 | 11.4 | 22.4 | 2 × PEN | Butadiene-styrene | 30 |
| Example 2 | PET | 27 | 150/150 | 35.4* | 42 | 59.1 | 14.9 | 24.8 | 2 × PEN | Butadiene-styrene | 30 |
| Example 3 | PEEK | 38 | 73/52 | 58* | 50 | 71.6 | 29 | 35.8 | 2 × PEN | Butadiene-styrene | 30 |
| Comparative Example 1 | n/a | n/a | n/a | n/a | n/a | n/a | n/a | n/a | 2 × PEN | Butadiene-styrene | 30 |

Figure 10:
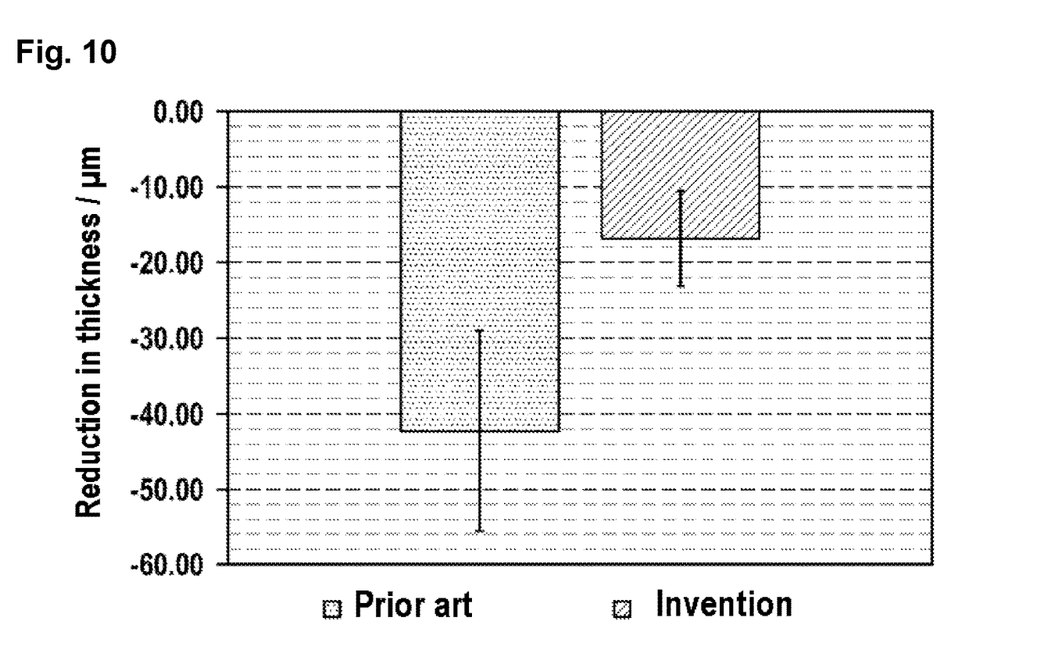
FIG. 10 shows the settling behavior of sealing frames of the examples.

FIG. 10 shows a comparison of the settling behavior of the sealing frame from Comparative Example 1 and the sealing frame from Example 1. The comparison shows that a marked reduction in the settling behavior was achieved by the use of the reinforcement structure in Example 1.

Figure 1:
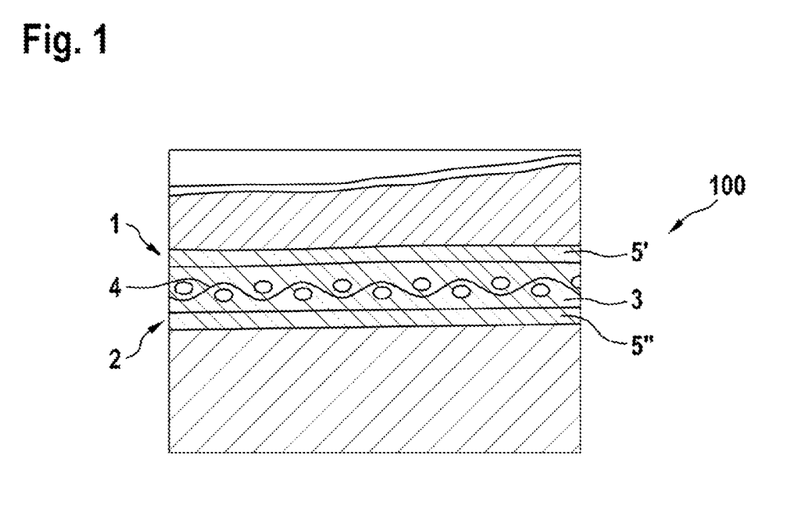
FIG. 1 shows a scanning electron micrograph of a sealing frame of an MEA according to a first example in cross section.

FIG. 1 shows a scanning electron microscopy section of an MEA 100 according to a first example. Reference sign 1 denotes a first sealing layer and reference sign 2 denotes a second sealing layer. The first and second sealing layers 1, 2 are bonded together via an adhesive 3. Furthermore, reference sign 4 denotes a reinforcement structure which is in the form of a woven fabric, that is to say in the form of a reinforcement layer, and which is surrounded by the adhesive 3. The adhesive 3 penetrates the through-holes in the woven fabric. Reference sign 5' denotes a first carrier film of the first sealing layer 1 and reference sign 5" denotes a second carrier film of the second sealing layer 2.

The sealing frame was produced by coating two carrier films 5' and 5" with adhesive 3 in the form of an adhesive layer. The woven fabric was then laid on the adhesive layer of the first carrier film 5', the carrier films 5', 5" were arranged with their adhesive layers facing one another and pressed together under pressure and temperature so that a robust composite in the sealing frame was produced.

Figure 2A:
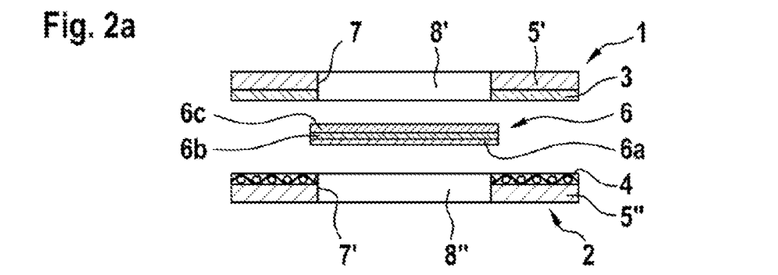
FIGS. 2a-2c show a layer assembly of an MEA according to a second example.
Figure 2B:
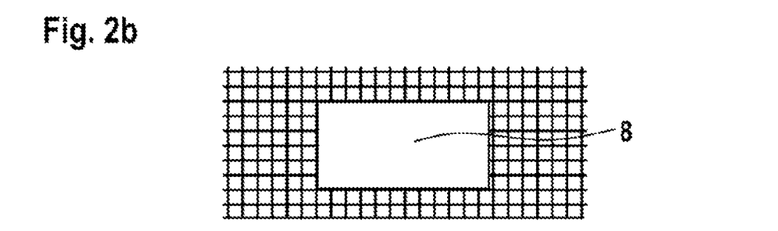
Figure 2C:
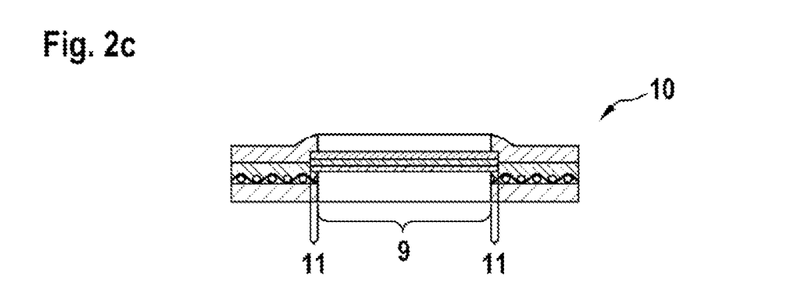

FIG. 2 with FIGS. 2a, 2b and 2c shows a layer assembly of an MEA 10 according to a second example. FIG. 2a schematically shows that, in the layer assembly of the MEA 10, the first sealing layer 1 comprises a first carrier film 5' and an adhesive 3 in the form of an adhesive layer. The second sealing layer 2 comprises a second carrier film 5" and a reinforcement structure 4 which is in the form of a reinforcement layer, and in particular in the form of a woven fabric. The first sealing layer 1 and the second sealing layer 2 are arranged with respect to one another such that the reinforcement structure 4 faces the adhesive layer. A plan view of the first sealing layer 1 is shown in detail in FIG. 2b.

A window-like or picture-like cutout 7 is provided in the first sealing layer 1 and constitutes an exposed inner region 8' of the first sealing layer 1. A window-like or picture-like cutout 7' is likewise provided in the second sealing layer 2 and constitutes an exposed inner region 8" of the second sealing layer 2. The window-like cutouts 7, 7' result in a frame-like structure of the first and second sealing layers 1, 2 with exposed inner region 8 of the sealing frame.

Reference sign 6 denotes a catalyst-coated membrane 6 (CCM) which comprises a membrane 6b arranged between an anode 6a and a cathode 6c. The CCM is arranged between the first and second sealing layers 1, 2 such that, after bonding the individual layers of the layer assembly, at least mutually superposed subregions 9 of the cathode, of the anode and of the membrane are exposed in the inner region 8 of the sealing frame. In addition, an overlap region 11 is formed which runs around the layers of the MEA 10 and in which subregions of the CCM 6 overlap with the first and second sealing layers 1, 2.

The reinforcement structure 4 is configured to take up adhesive 3, which impregnates the reinforcement structures 4 and, after bonding the layers of the layer assembly, as shown in FIG. 2c, durably and firmly bonds the first sealing layer 1 and the second sealing layer 2 to form a stable sealing frame and in which the adhesive 3 is retained in a creep-proof, outflow-proof and leak-proof manner.

FIG. 2c shows the layer assembly from FIG. 2a after bonding the layers. The first and second sealing layers 1, 2 are bonded together via the adhesive 3, the adhesive 3 penetrating and impregnating the reinforcement structure 4, and thus on the one hand a stable sealing frame is produced and on the other hand creeping and outflow under the use conditions of the membrane electrode assembly 10 are prevented.

Figure 3A:
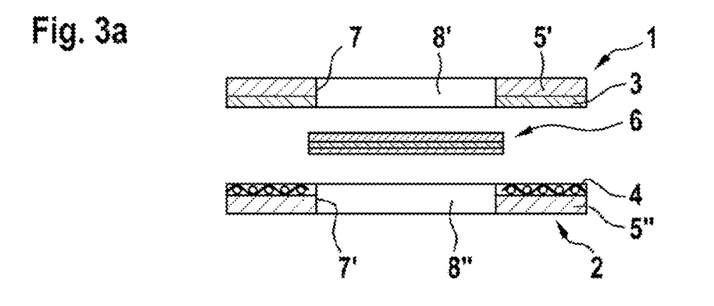
FIGS. 3a-3c show a layer assembly of an MEA according to a third example.
Figure 3B:
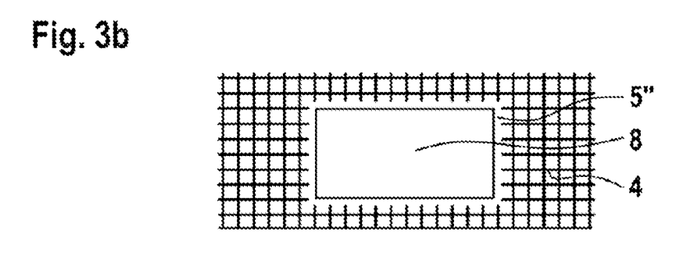
Figure 3C:
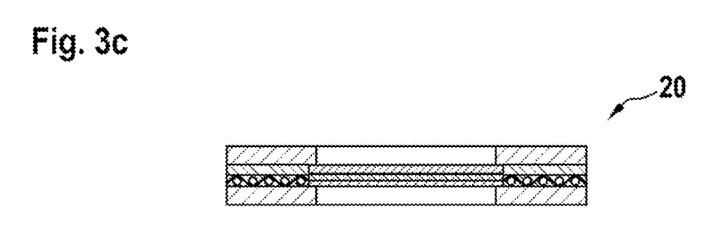

FIGS. 3a-c, like FIGS. 2a-c, show a layer assembly of layers producing a membrane electrode assembly 20 (FIG. 3a), a plan view of the first sealing layer 1 (FIG. 3b) and an MEA 20 according to a third example which has been produced from the layer assembly of FIG. 3a. In contrast to the first and second sealing layers 1, 2 in FIG. 2, the first and second sealing layers in FIG. 3 are formed such that the window-like cutout in the reinforcement structure 4 is larger than the window-like cutout in carrier films 5', 5".

Figure 4A:
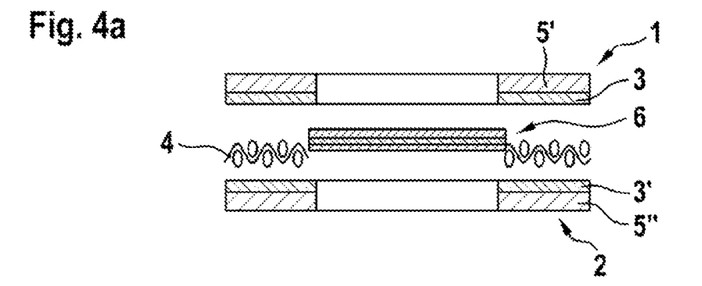
FIGS. 4a-4c show a layer assembly of an MEA according to a fourth example.
Figure 4B:
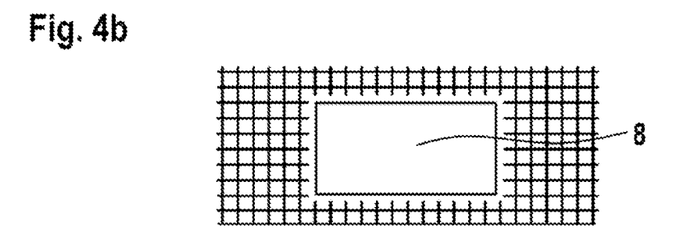
Figure 4C:
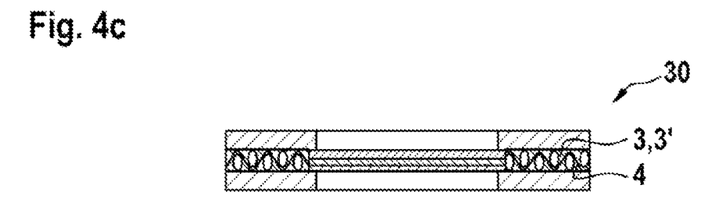

FIGS. 4a-c, like FIGS. 2a-c and 3a-c, show a layer assembly of layers producing a membrane electrode assembly 30 (FIG. 4a), a plan view of the first sealing layer 1 (FIG. 4b) and an MEA 30 according to a fourth example (FIG. 4c) which has been produced from the layer assembly of FIG. 4a. In contrast to FIGS. 2 and 3, in the layer assembly in FIG. 4a, two adhesive layers of adhesive 3 and 3' are present which are correspondingly arranged on a first carrier film 5' and on a second carrier film 5", with a reinforcement structure 4 initially being provided as a loose layer with a window-like cutout and being loosely joined to the CCM 6. Pressing of the layers results in the MEA 30 as illustrated in FIG. 4c.

Figure 5A:
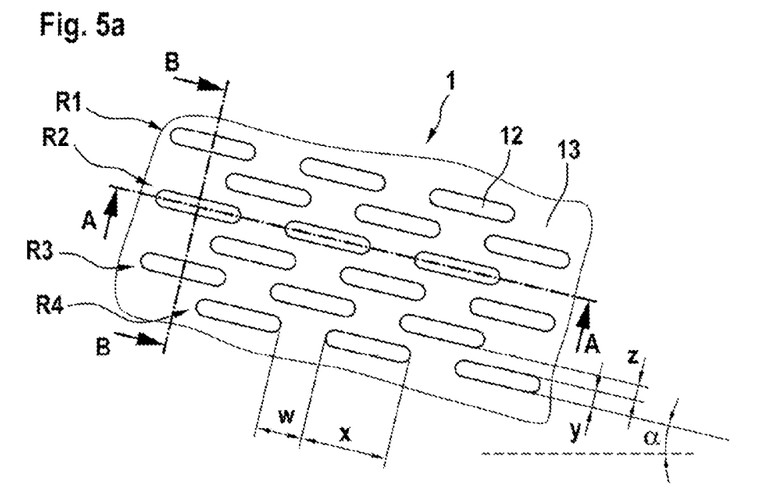
FIGS. 5a-5c show a schematic view of a sealing layer comprising raised structures according to a fifth example.
Figure 5B:
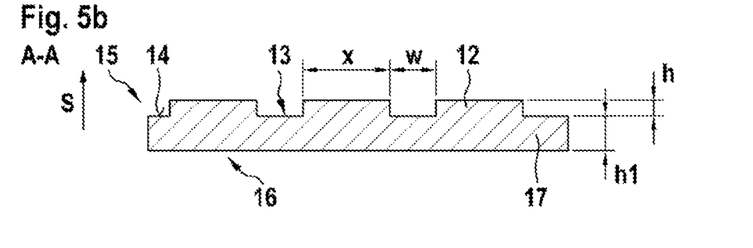
Figure 5C:
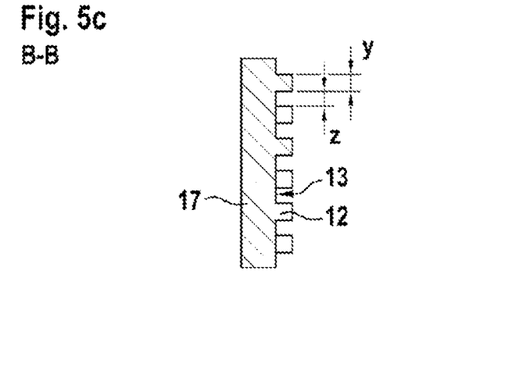

FIG. 5 shows in detail a schematic view of an exemplary first sealing layer 1 comprising a reinforcement structure 4 in the form of raised structures 12 according to a fifth example, FIG. 5a showing a plan view, FIG. 5b showing a sectional view along A:A and FIG. 5c showing a sectional view along B:B. The reinforcement structure is formed in the first sealing layer 1 and hence is an integral part of the first sealing layer 1. As a result of the formation of the raised structures 12, the surrounding regions of the first sealing layer 1 have a relatively low height and hence constitute cavities 13 or depressions.

The raised structures 12 are in the form of linear ridges and have a height h of more than 3 µm, preferably of more than 10 µm and particularly preferably of more than 15 µm. The height h of the raised structures 12 is measured here (see FIG. 5b) starting from the surface 14 of the first side 15 of the first sealing layer 1 on which the raised structures 12 are formed up to the highest point of the raised structures 12 in the layer thickness direction S. The second side 16 of the first sealing layer 1 does not have any raised structures and is flat in form. This results in a planar section of the first sealing layer, which is referred to as base layer 17 and has a height h1 which imparts a high dimensional stability on the sealing structure.

The ridges in particular have a width y of 5 µm to 5 mm, preferably of 50 µm to 500 µm, and a length x of 10 µm to 10 mm, preferably of 100 µm to 1 mm. As shown here, the width of a ridge is the shorter side and the length of the ridge is the longest side, the length and the width of the ridge lying perpendicular to the height of the ridge.

As shown in FIG. 5a, the ridges are arranged one behind the other along their length x in mutually parallel rows R1, R2, R3 and R4, with the ridges in each row R1-R4 being arranged in longitudinal direction one behind the other with a respective spacing w. A spacing between two adjacent rows R1-R4 is denoted with z. Typical values for y and z are 5 µm to 5 mm and preferably 50 µm to 500 µm. Typical values for w and x are 10 µm to 10 mm and preferably 100 µm to 1 mm.

As a result of the formation of the raised structures 12 in the form of ridges, as shown in FIG. 5, cavities 13, or in other words depressions, are formed between the raised structures 12, these being able to take up adhesive and prevent creeping or leaking. By using a first sealing layer 1 as shown here, thinning of the sealing frame can be prevented and hence a high stability that is good over the long term can be achieved in a membrane electrode assembly.

Figure 6A:
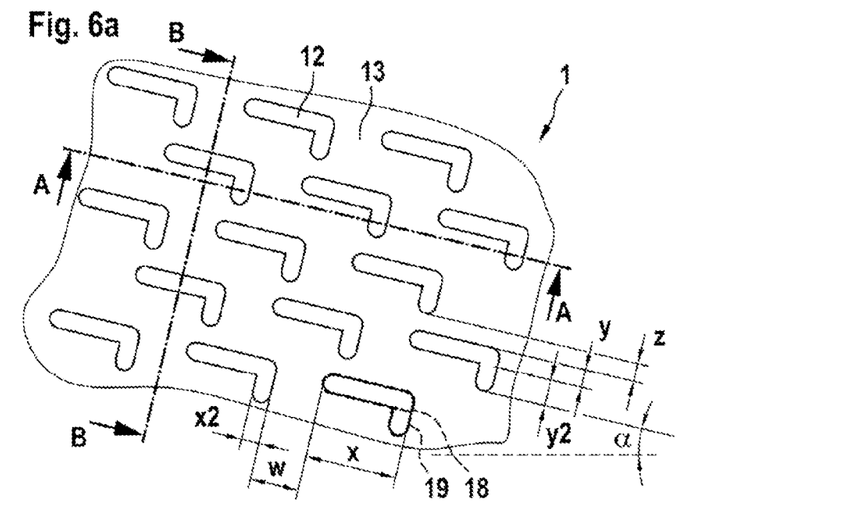
FIGS. 6a-6c show a schematic view of a sealing layer comprising raised structures according to a sixth example.
Figure 6B:
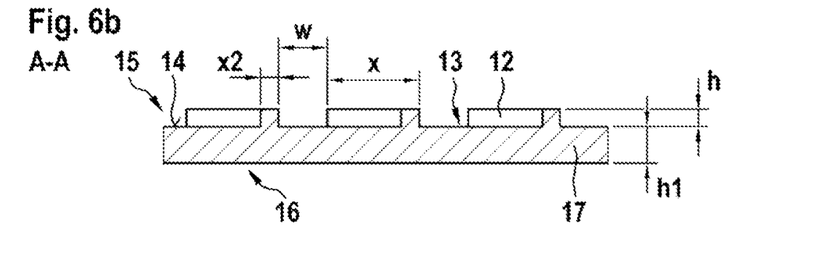
Figure 6C:
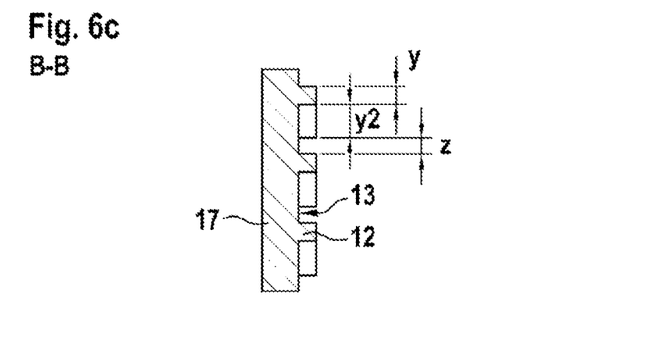

FIG. 6, with FIGS. 6a, 6b and 6c, shows a schematic view of a first sealing layer 1 comprising raised structures 12 according to a sixth example.

In contrast to the raised structures 12 from FIG. 5, the raised structures 12 from FIG. 6 are of L-shaped form. The L-shaped structure can be divided into two substructures, a linear substructure 18 as shown in FIG. 5 and a substructure 19 arranged perpendicularly thereto. The linear substructure 18 again has a length x and a width y. The substructure 19 running perpendicularly thereto has a length y2 and a width x2. Typical values for y and z are 5 µm to 5 mm and preferably 50 µm to 500 µm. Typical values for w, x, x2 and y2 are 10 µm to 10 mm and preferably 100 µm to 1 mm.

Also as a result of the formation of the raised structures 12 shown in FIG. 6 in the form of L-shaped ridges, cavities 13 (depressions) are formed between the raised structures 12, these being able to take up adhesive and prevent creeping or leaking. By using a first sealing layer 1 as shown here, thinning of the sealing frame can likewise be prevented and hence a high stability that is good over the long term can be achieved in a membrane electrode assembly.

Figure 7A:
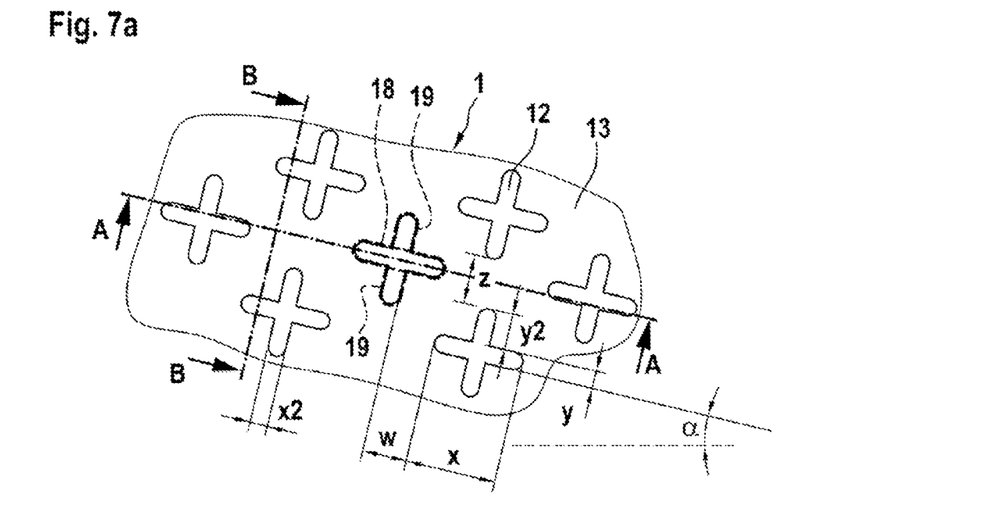
FIGS. 7a-7c show a schematic view of a sealing layer comprising raised structures according to a seventh example.
Figure 7B:
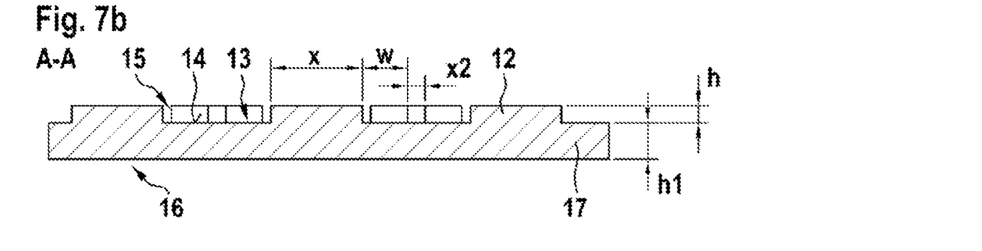
Figure 7C:
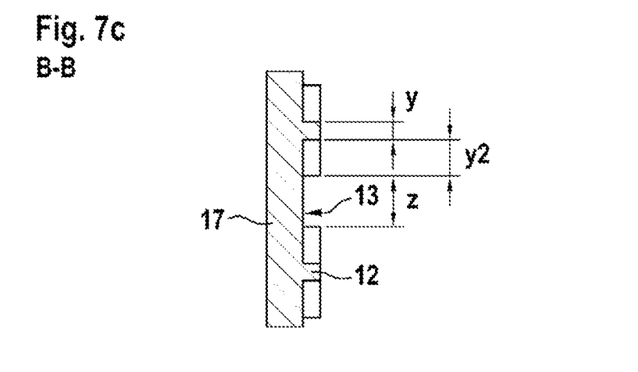

FIG. 7, with FIGS. 7a, 7b and 7c, shows a schematic view of a first sealing layer 1 comprising raised structures 12 according to a seventh example.

In contrast to the raised structures 12 from FIG. 5, the raised structures 12 from FIG. 7 are of cross-shaped form. The crosses are regular in form and can be divided into substructures, a linear substructure 18 as shown in FIG. 5 and two substructures 19 arranged perpendicularly thereto and identical in form. The linear substructure 18 again has a length x and a width y. The substructures 19 running perpendicularly thereto have a length y2 and a width x2. Typical values for y and z are 5 µm to 5 mm and preferably 50 µm to 500 µm. Typical values for w, x, x2 and y2 are 10 µm to 10 mm and preferably 100 µm to 1 mm.

Also as a result of the formation of the raised structures 12 shown in FIG. 7 in the form of cross-shaped ridges, cavities 13 (depressions) are formed between the raised structures 12, these being able to take up adhesive and prevent creeping or leaking. By using a first sealing layer 1 as shown here, thinning of the sealing frame can likewise be prevented and hence a high stability that is good over the long term can be achieved in a membrane electrode assembly.

Figure 8A:
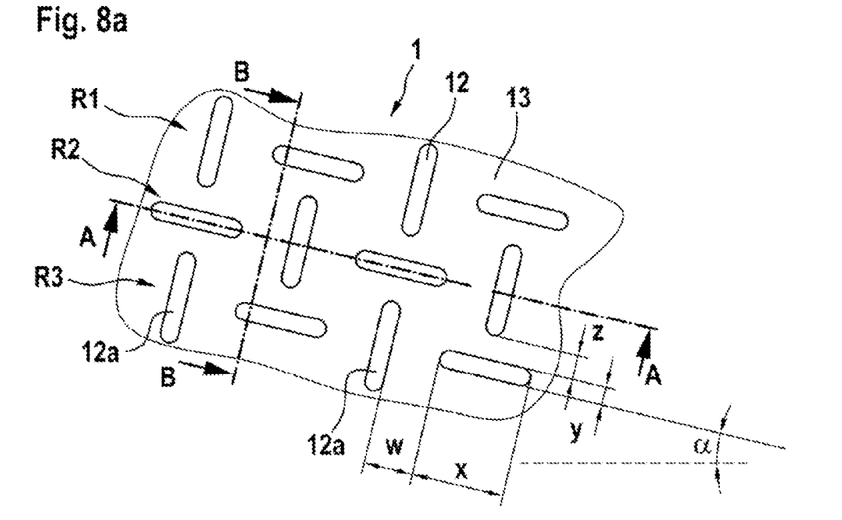
FIGS. 8a-8c show a schematic view of a sealing layer comprising raised structures according to an eighth example.
Figure 8B:
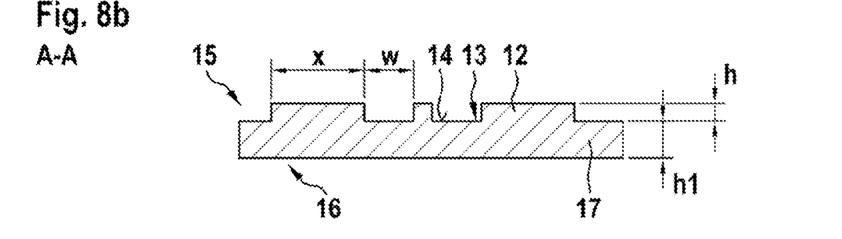
Figure 8C:
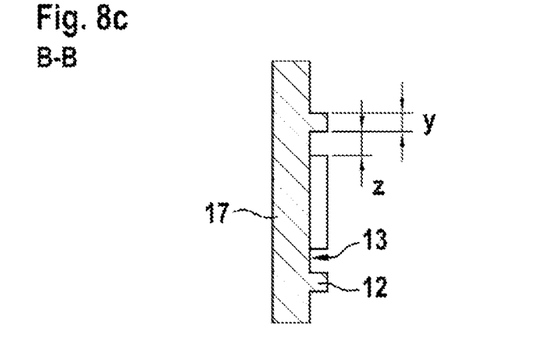

FIG. 8 shows in detail a schematic view of a first sealing layer 1 comprising raised structures 12 according to an eighth example. As with the raised structures 12 from FIG. 5, the raised structures 12 from FIG. 8 are likewise in the form of linear ridges and are arranged in rows R1, R2 and R3, except that in each row R1-R3 every second linear raised structure 12a, i.e., every second ridge, is arranged perpendicularly with respect to the preceding and following linear raised structures 12. The respective centers of the perpendicularly arranged linear raised structures 12a are located on the longitudinal axis of the raised structures 12 arranged linearly one behind the other in the row.

The ridges are in particular identical in length and width and in particular have a width y of 5 µm to 5 mm, preferably of 50 µm to 500 µm, and a length x of 10 µm to 10 mm, preferably of 100 µm to 1 mm. The ridges are arranged with a respective spacing w one behind the other in the rows R1-3 in the longitudinal direction of the linear raised structures 12. A spacing between two adjacent rows R1-R3 is denoted with z. Typical values for y and z are 5 µm to 5 mm and preferably 50 µm to 500 µm. Typical values for w and x are 10 µm to 10 mm and preferably 100 µm to 1 mm.

Also as a result of the formation of the raised structures 12 shown in FIG. 8 in the form of linear ridges arranged perpendicularly with respect to one another, cavities 13 (depressions) are formed between the raised structures 12, these being able to take up adhesive and prevent creeping or leaking. By using a first sealing layer 1 as shown here, thinning of the sealing frame can likewise be prevented and hence a high stability that is good over the long term can be achieved in a membrane electrode assembly.

Figure 9A:
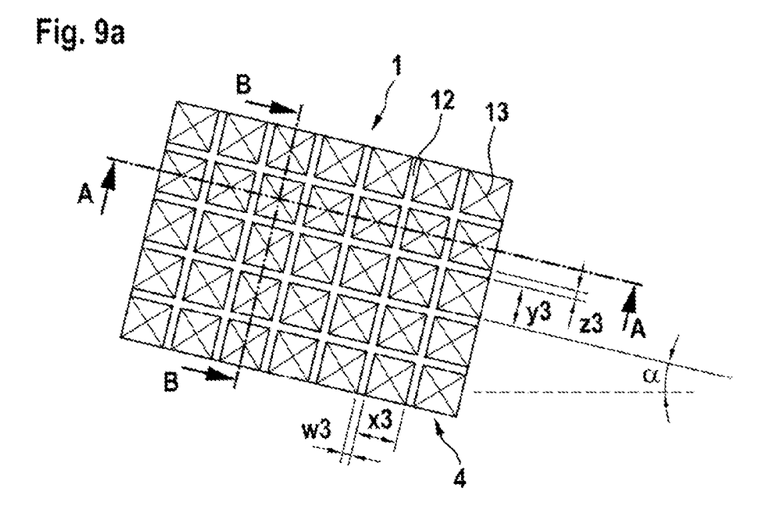
FIGS. 9a-9c show a schematic view of a sealing layer comprising raised structures according to a ninth example.
Figure 9B:
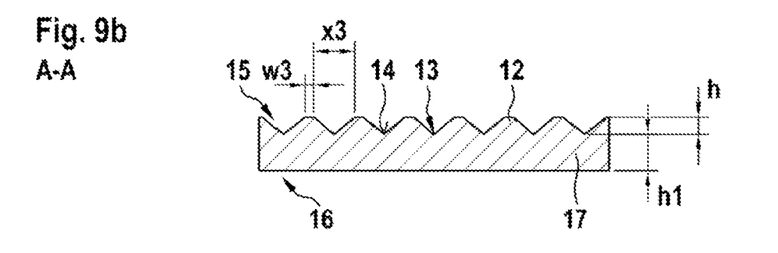
Figure 9C:
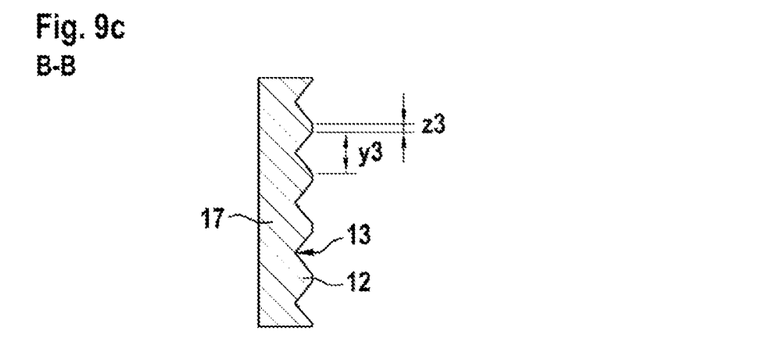

FIG. 9, with FIGS. 9a, 9b and 9c, shows a schematic view of a first sealing layer 1 comprising raised structures 12 according to a ninth example. In contrast to the previous first sealing layers 1, the first sealing layer 1 shown in FIG. 9 is configured such that the reinforcement structures are formed in the form of interconnected rectangles, with the cavities 13 lying in the interior of the rectangles having an inverted pyramid-shaped structure. Each rectangle has a length x3 and a width y3, each measured at the inner edges of the rectangles formed by the raised structures 12. In this example, w3 is the respective width of the raised structures 12 between two rectangles adjoining one another in the longitudinal direction and z3 is the respective width of the raised structures 12 between two rectangles adjoining one another in the transverse direction.

Also as a result of the formation of the raised structures 12 shown in FIG. 9 in the form of rectangles, resulting in a "closed" reinforcement structure 4 having raised structures 12 at its outer edges, with cavities 13 (depressions) being formed in the interior of the rectangles, adhesive can be taken up into the reinforcement structure 4 and hence prevented from creeping or leaking. By using a first sealing layer 1 as shown here, thinning of the sealing frame can likewise be prevented and hence a high stability that is good over the long term can be achieved in a membrane electrode assembly.

In addition to the preceding written description, reference is hereby explicitly made to the graphic illustration in FIGS. 1 to 9 for additional disclosure thereof.

The invention claimed is:

1. A membrane electrode assembly comprising:
a cathode;
an anode;
a proton-conductive membrane arranged between the cathode and the anode; and
a sealing frame that surrounds the cathode, the anode and the membrane at edges thereof, wherein, in an inner region of the sealing frame at least mutually superposed subregions of the cathode, the anode and the membrane are exposed, the sealing frame, in a layer thickness direction comprises a first sealing layer and a second sealing layer bonded to each other by an adhesive, and the first sealing layer and/or the second sealing layer has a reinforcement structure.

2. The membrane electrode assembly as claimed in claim 1, wherein the reinforcement structure is formed in the first sealing layer and/or in the second sealing layer.

3. The membrane electrode assembly as claimed in claim 2, wherein, to obtain the reinforcement structure, a first side of the first and/or second sealing layer oriented in a direction of a first side of the corresponding second or first sealing layer, has raised structures having a height of more than 3 μm, the raised structures comprise ridges that are L-shaped, T-shaped or cross-shaped form, and the ridges have a width of 5 μm to 5 mm, and a length of 10 μm to 10 mm, and cavities lying between the raised structures are square, rectangular, circular or hexagonal.

4. The membrane electrode assembly as claimed in claim 3, wherein a layer thickness of an adhesive layer formed by the adhesive is at least as great as a sum total of the heights of the raised structures in the first and second sealing layers or at least as great as a layer thickness of the reinforcement layer present in the first and second sealing layers.

5. The membrane electrode assembly as claimed in claim 3, wherein a proportion by volume of cavities present between the raised structures, based on a total volume of cavities and raised structures, is 10% to 99%.

6. The membrane electrode assembly as claimed in claim 1, wherein the first sealing layer and/or the second sealing layer comprises a carrier film and a reinforcement structure in the form of a reinforcement layer.

7. The membrane electrode assembly as claimed in claim 6, wherein a proportion by volume of through-holes formed in the reinforcement layer, based on a total volume of the reinforcement layer, is 10% to 99%, and/or an inner region of the reinforcement layer is larger than an inner region of the carrier film.

8. The membrane electrode assembly as claimed in claim 1, wherein the reinforcement structure comprises a woven structure and/or a porous structure and/or a perforated structure, the reinforcement structure comprises fibers, carbon fibers, a metal mesh, porous ceramics or polymers selected from the group of polyolefins, polyesters, aromatic polymers, (per) fluorinated polymers, polysiloxanes and mixtures thereof.

9. The membrane electrode assembly as claimed in claim 1, wherein the reinforcement structure has a softening temperature of more than 75° C., and/or
the first sealing layer and/or the second sealing layer overlaps the anode and/or the cathode and/or the membrane and forms an overlap region, wherein the sealing frame overlaps the anode, the cathode and the membrane, in equal parts.

10. The membrane electrode assembly as claimed in claim 1, wherein a pure adhesive layer formed by the adhesive is present between the first sealing layer and the second sealing layer and the adhesive layer consisting of adhesive only, has a layer thickness of less than 30 μm, and/or
the anode and the cathode are applied directly to the membrane and form a catalyst-coated membrane, and/or
further comprising a first gas diffusion layer arranged on a face of the anode that faces away from the membrane and a second gas diffusion layer arranged on a face of the cathode that faces away from the membrane.

11. A fuel cell, electrolytic cell, electrochemical hydrogen compressor, redox flow battery or electrochemical sensor comprising the membrane electrode assembly as claimed in claim 1.

* * * * *